Patented Sept. 5, 1922.

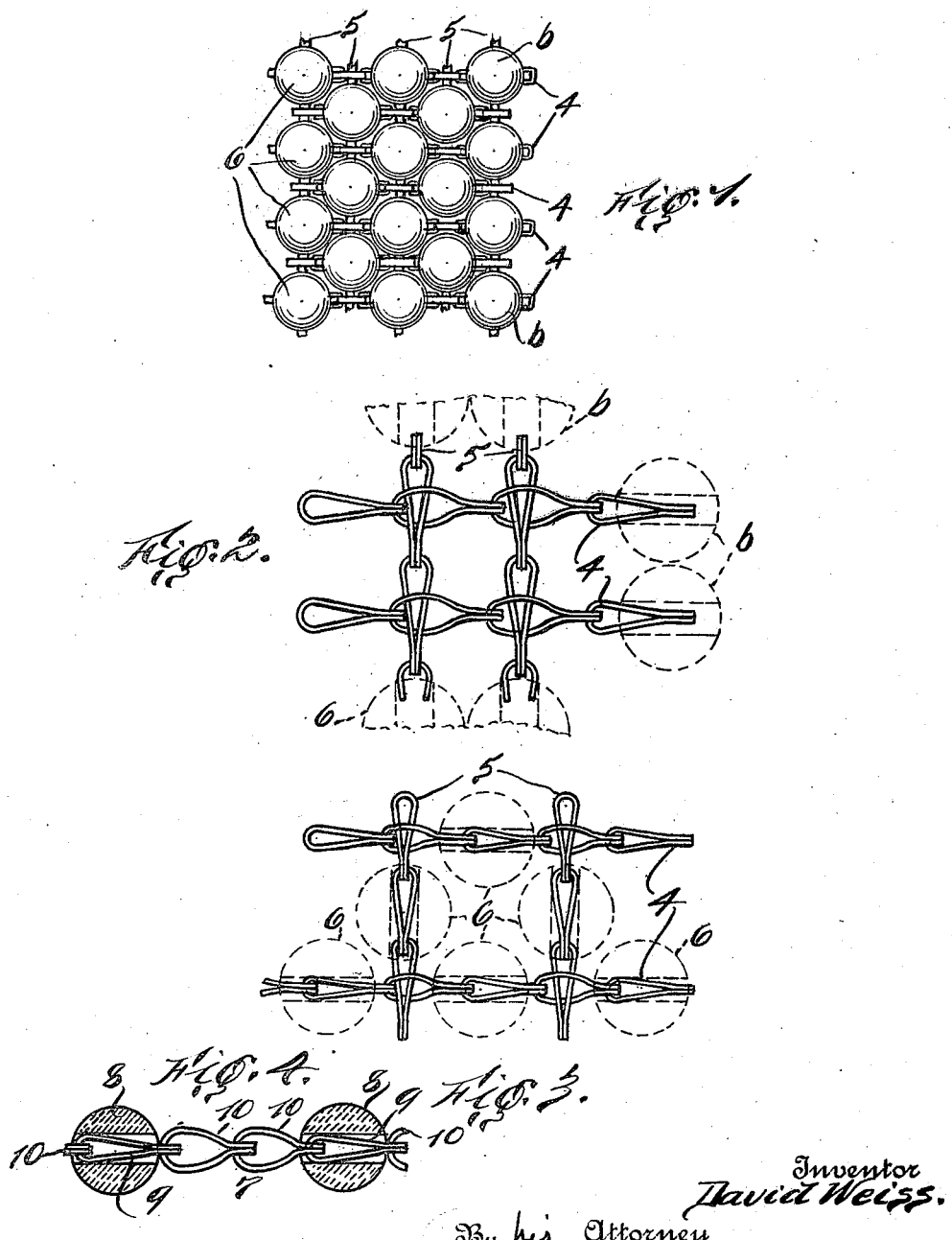

1,428,348

UNITED STATES PATENT OFFICE.

DAVID WEISS, OF NEW YORK, N. Y.

ART OF STRINGING PEARLS AND THE LIKE.

Application filed March 16, 1921. Serial No. 452,735.

*To all whom it may concern:*

Be it known that I, DAVID WEISS, a resident of New York city, county and State of New York, and a citizen of the United States of America, have invented certain new and useful Improvements in the Art of Stringing Pearls and the like, of which the following is a specification.

This invention relates to improvements in the art of stringing pearls, beads or similar ornamental elements, one of the objects being to provide a unique manner of stringing pearls or the like to produce a durable and artistic assemblage of ornamental elements for making bags, bracelets, necklaces or the like.

I will now proceed to describe my intention in detail, the novel features of which I will point out in the appended claim, reference being had to the accompanying drawing, wherein:—

Fig. 1 is a fragmentary diagrammatic view, illustrating an assemblage of beads strung in accordance with my invention;

Fig. 2 is a similar view illustrating one arrangement of interconnected chains;

Fig. 3 is a view similar to Fig. 2, illustrating another arrangement of interconnected chains; and Fig. 4 illustrates another embodiment of my invention.

To carry my improvement into practice, I preferably employ a plurality of independent chain-members 4, disposed in parallelism, in combination with a plurality of cross chain members 5. Each chain 4 and 5 is made up of a plurality of normally inseparably connected links. The form of chain which I preferably employ is known in the trade as fox-tail. To form a meshed carrier, to support the beads, or other article of ornamentation, 6, I interconnect the chain members 4 and 5, that is to say, I pass certain links of chain 5 through certain links of chain 4, according to the design or effect to be produced. The links of chain 4 through which certain links of chain 5 are passed are spread or opened beyond the normal state, as indicated in Figs. 2 and 3, to allow the said links of chain 5 to engage same. When chains 4 and 5 are interconnected in manner described, an exceedingly durable structure will be formed, and one that cannot be easily broken, as no part of the chains has been weakened in any way. To thread the pearls or beads onto the chains, and also to interweave the chains, a threading needle will be used. After the chains 5 have been woven into position, the needles or threading instruments are removed. A suitable instrument for spreading the links is employed. To produce a desired article, such as a hand-bag (for instance) the chains 4 are strung with the beads or the like to be used; after these chains have been strung, certain of said beads on each chain are parted or separated, after which the link in chains 4 positioned in the space between the parted beads are spread to increase the loop. After certain beads on the chains 4 have been separated and the links, located in the spaces, opened or spread, the beads 6 are placed between the opened or spread links of chain 4 and the chains 5 passed through the alining spread links of chain 4 and the line of beads 6 alining therewith. After one chain 5 has been threaded through the beads and through the opened links of chain 4, a second chain is threaded through a second line of beads 6 and a second line of spread alining links of chain 4. This operation is carried on until the entire article is completed. Different effects can be produced by varying the distance between spread links, as is indicated in Figs. 2 and 3.

It will be apparent that I am able to produce a durable supporting medium for ornamental elements without severing any part of the interconnected elements which go to make up the support; nor do I employ any third elements to secure the links of the chains together, such as strands of wire, clamps, etc.

Fig. 4 illustrates a manner of stringing pearls to produce a necklace, for instance, or a single string. In this form a chain 7 will be provided with a plurality of pearls 8 supported by links 9 of normal shape; the links 10 between the pearls, however, are spread to provide stops or shoulders to hold the pearls in prearranged spaced relationship, dispensing with the necessity of providing supplemental means to hold the pearls in desired spaced relationship.

What I claim and desire to secure by Letters Patent is:—

A plurality of chain members arranged in parallelism, each chain being made up of a plurality of normally inseparably connected elongated links, certain of said elongated links having a portion thereof wider than the adjacent elongated links, to provide stops, cross chains passing through the links having the wide portions, and pearls carried by the links of the chain members which connect the links having the wide portion.

DAVID WEISS.